(12) United States Patent  
Eastman, III (10) Patent No.: US 7,047,874 B1  
(45) Date of Patent: May 23, 2006

(54) MARINADE TUMBLER

(75) Inventor: Robert Eastman, III, Flushing, MI (US)

(73) Assignee: Eastman Holding Company, Flushing, MI (US)

( * ) Notice: Subject to any disclaimer, the term of this patent is extended or adjusted under 35 U.S.C. 154(b) by 161 days.

(21) Appl. No.: 10/717,982

(22) Filed: Nov. 20, 2003

(51) Int. Cl.
*A47J 43/04* (2006.01)

(52) U.S. Cl. .............................. 99/468; 99/472; 99/535; 366/139; 366/233

(58) Field of Classification Search ................ 366/139, 366/200, 208, 213, 220, 225, 228, 233; 99/468, 99/472, 535
See application file for complete search history.

(56) References Cited

U.S. PATENT DOCUMENTS

| | | | |
|---|---|---|---|
| 7,766 A * | 11/1850 | Starkweather | 426/281 |
| 1,740,302 A * | 12/1929 | Hodges et al. | 165/109.1 |
| 2,597,291 A * | 5/1952 | Clegg | 366/208 |
| 3,521,863 A * | 7/1970 | Graham | 366/139 |
| 4,214,518 A | 7/1980 | Petsche | |
| 4,446,779 A | 5/1984 | Hubbard et al. | |
| 4,517,888 A | 5/1985 | Gould | |
| 4,785,727 A | 11/1988 | Miyata et al. | |
| 4,836,099 A | 6/1989 | Thirode | |
| 4,940,590 A | 7/1990 | Williams et al. | |
| 5,104,232 A * | 4/1992 | Lennox, III | 366/227 |
| 5,323,694 A * | 6/1994 | Higashimoto | 99/535 |
| 6,040,013 A | 3/2000 | Karales | |
| 6,595,846 B1 * | 7/2003 | Lagares Corominas | 452/141 |
| 2002/0023549 A1 * | 2/2002 | Thornton et al. | 99/472 |
| 2003/0085234 A1 | 5/2003 | Paumen et al. | |

* cited by examiner

*Primary Examiner*—David Sorkin
(74) *Attorney, Agent, or Firm*—Carrier, Blackman & Associates; William Blackman; Joseph P. Carrier (57) ABSTRACT

A food marinating apparatus includes a substantially cylindrical canister and a base unit including a motor, a plurality of rollers, a vacuum pump, and a control panel. The base unit is operable to rotate the canister thereon. The vacuum pump is provided for reducing the ambient pressure inside of the vessel, to improve marinade absorption by the food. Food such as meat or fish will receive marinade more quickly under low pressure than under atmospheric pressure, and additionally, by rotating the containment vessel, the food is agitated in the presence of the marinade, for a higher degree of marinade absorption.

17 Claims, 11 Drawing Sheets

MARINADE TUMBLER

BACKGROUND OF THE INVENTION

1. Field of the Invention

The present invention relates to an apparatus for treating uncooked foodstuffs, such as meat, fish, or vegetables. More particularly, the present invention relates to vacuum tumblers, for marinating and tenderizing foods in a low-pressure environment.

2. Description of the Background Art

People have long tried to improve the taste and tenderness of foods, especially meat products. A variety of techniques have been used. Salt, wine, oil, and a combination of herbs and vegetables have been used to make meat products easier to chew and better tasting. Chefs have known for many years that marinating meat, fish and vegetables improves the flavor and texture thereof.

Research has been conducted regarding processed meat products; specifically, the desirability to bring myosin proteins to the meat surface. Myosin is the most common protein found in muscle, the primary content of meat products, and it acts as a binding agent to keep the muscle tissue of the meat together. This condition is anathema to tender meat, which is easy to chew and requires little effort to cut. Therefore, reducing the amount of myosin in meat is desired, as such reduction will make the meat more tender.

One method for reducing the amount of myosin in meat involves tumbling the meat in a drum. The drum contains internal paddles to cause the meat to continually rotate and tumble.

This type of known meat tumbler has some drawbacks. One drawback of most currently known meat tumblers is that the sheer size of the tumbler makes it impractical for home use. These tumblers are built primarily for the commercial market, where large amounts of meat are processed on a regular basis. Also, the tumbling action and the motor required to rotate the drum creates noise, which is undesirable in a home kitchen setting.

It has been found that tenderizing of meat products is accelerated when the products are placed in a vacuum-sealed canister. This development when applied to the large commercial tumblers described above does not make them any more practical for home kitchen use.

It has been known to marinate meat and other food products, in a reduced-pressure environment, in some smaller tumblers. For example, published U.S. patent application US 2003/0085234 suggests the use of a vacuum tumbler dimensioned to fit on a counter top, in which food may be marinated while it is tumbled in a vacuum.

SUMMARY OF THE INVENTION

The present invention provides an apparatus for use in marinating and tenderizing food products.

The present invention has been developed to solve the need for an automatic marinade tumbler meat-tenderizing machine for home use. By combining reduced pressure and tumbling in a marinade, in a practical, home kitchen-sized tenderizer; the present invention can provide homeowners with their own apparatus for tenderizing meat products.

The present invention allows the user to tenderize food more efficiently than simply placing it in a bowl and covering it with a liberal amount of marinade. The machine hereof enables the user to vacuum seal the component canister, and place it on a cradle including a set of drive wheels. These drive wheels are controlled from the machine's control panel. The user simply activates the on/off button and chooses a predetermined tumbling time.

A food marinating apparatus according to a selected illustrative embodiment of the present invention, generally, includes a base unit and a sealable canister which is configured to rest on top of the base unit. In a particular embodiment of the invention, a canister body is made translucent to allow a user thereof to see food while it is being treated therein.

Accordingly, it is an object of the present invention to provide an apparatus for marinating food products in a reduced pressure environment.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 12 A and 12B are alternate side plan views of a valve stem which is another component of the valve of FIG. 11A, and FIG. 12 C is an end plan view thereof;

DETAILED DESCRIPTION OF THE PREFERRED EMBODIMENTS

Overview

Referring now to FIGS. 1–3C of the drawings, a food treatment apparatus, according to a selected illustrative embodiment of the present invention, is shown generally at 10.

The food treatment apparatus 10 of the depicted embodiment, generally, includes a base unit 12 and a canister 50 which is rotatably restable on the base unit.

The base unit 12 includes a housing 14 having a cradle section 16 and a control section 18. During tumbling operation thereof, the canister 50 rests on its side on top of the cradle section 16 of the housing 14, as shown, and is rotatably movable thereon.

The canister 50 includes a hollow, substantially cylindrical main body 52 and a removable cover 54. The main body 52 of the canister 50 may be made translucent or transparent, to allow a user thereof to see the contents.

Each of these major components will be discussed in further detail below.

The Base Unit

As noted, the base unit 12 includes a housing 14 having a cradle section 16 and a control section 18 integrally attached to the cradle section. In use, the canister 50 rests on top of the cradle section 16 of the housing, and is rotated thereby. The housing 14 may have a plurality of resiliently deformable feet 15 attached to the bottom thereof, to raise it up above a substrate on which it sits. The lower surface of the housing 14 may have slots formed therein to allow for ventilation thereof.

Figure 5:
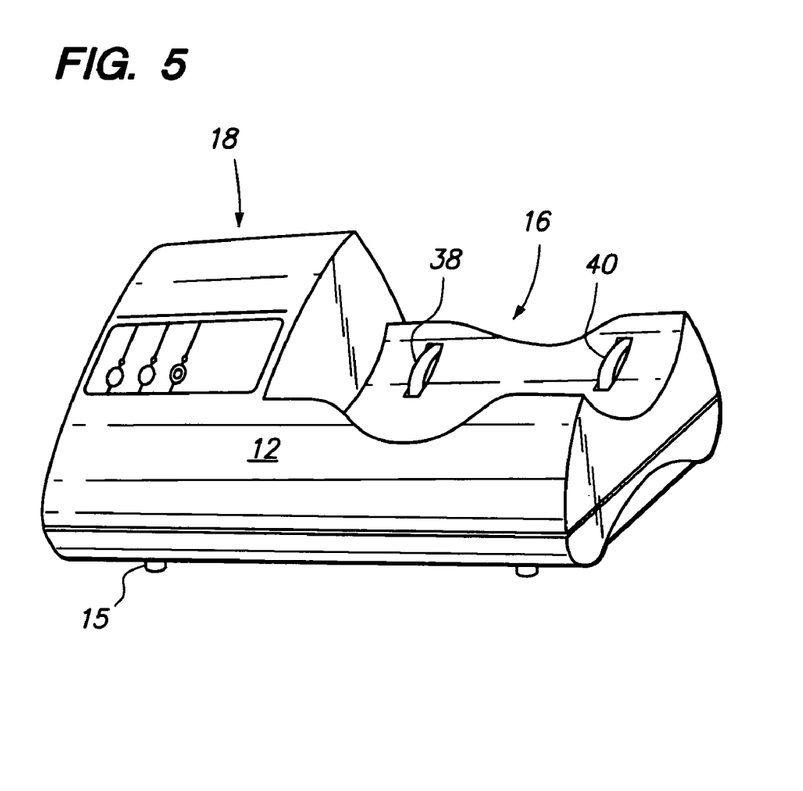
FIG. 5 is a perspective view of a base unit which is one component of the apparatus of FIGS. 1–2.
Figure 6A:
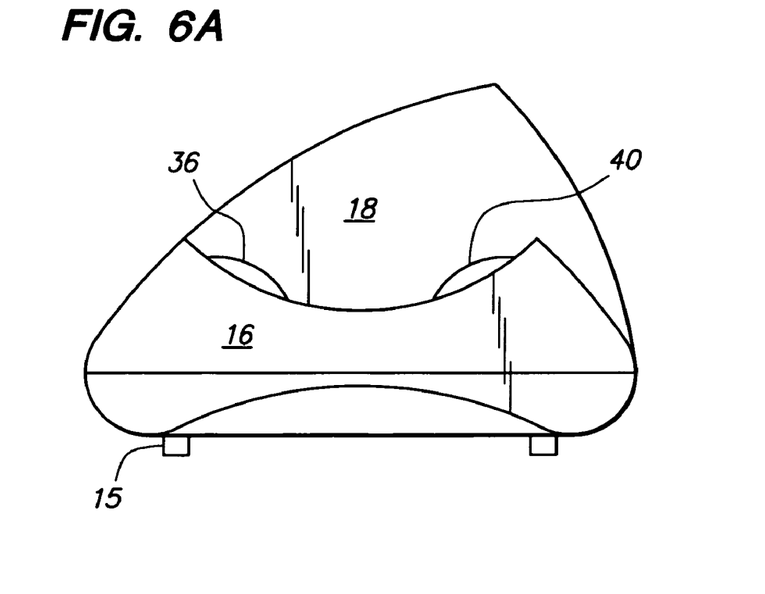
FIG. 6A is a side plan view of the base unit of FIG. 5.
Figure 6B:
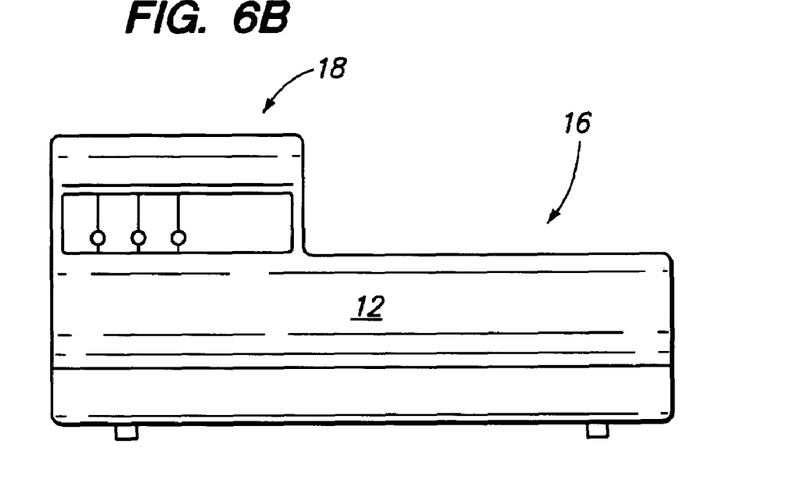
FIG. 6B is a front plan view of the base unit of FIG. 5.
Figure 6C:
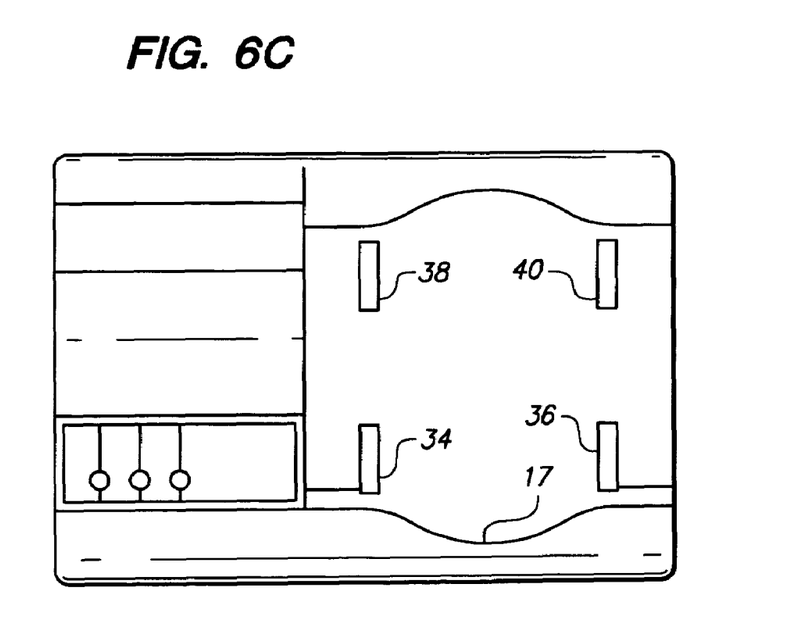
FIG. 6C is a top plan view of the base unit of FIG. 5.

As seen in the drawing, the cradle 16 may include an arcuate cutout 17 formed in the front portion thereof, to allow a user to reach a hand between the housing 14 and the canister 50, in order to facilitate lifting of the canister off of the housing.

Figure 6D:
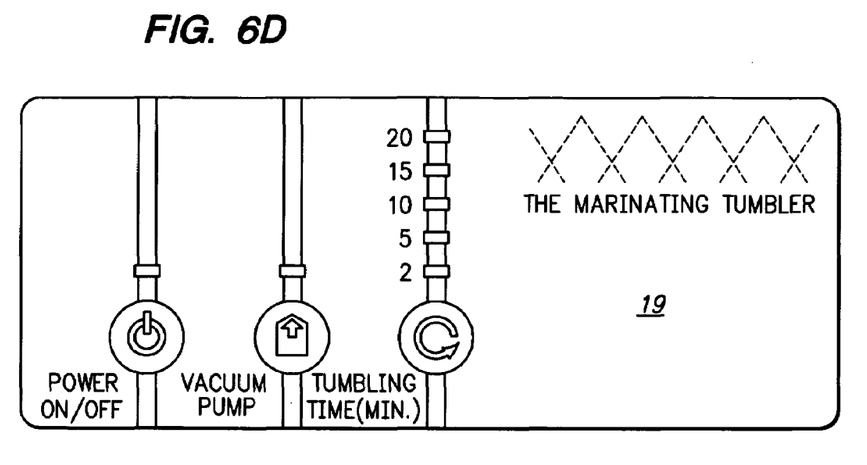
FIG. 6D is a detail view of a control panel on the base unit of FIG. 5.

The control section 18 includes a control panel 19, to allow a user of the apparatus to control operation thereof. As shown in FIG. 6D, the control panel allows a user to turn the unit on and off, to control the vacuum pump 20, and to set a timer for tumbling operation of the motor 30.

Figure 6E:
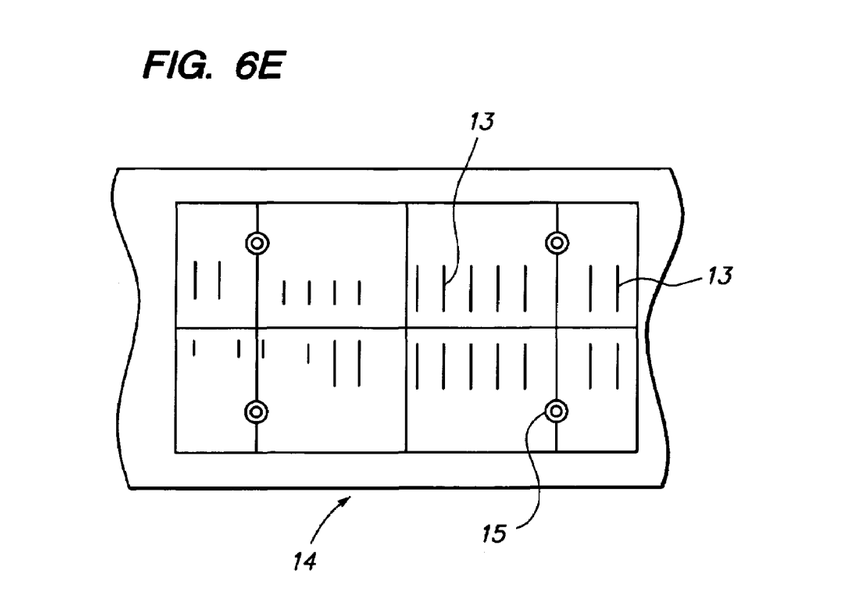
FIG. 6E is a bottom plan view of the base unit of FIG. 5.

As shown in FIG. 6E, the bottom surface of the housing 14 has a plurality of openings 13 formed therethrough to provide ventilation to the interior thereof. In the depicted embodiment, these openings 13 are provided as slots.

Figure 4:
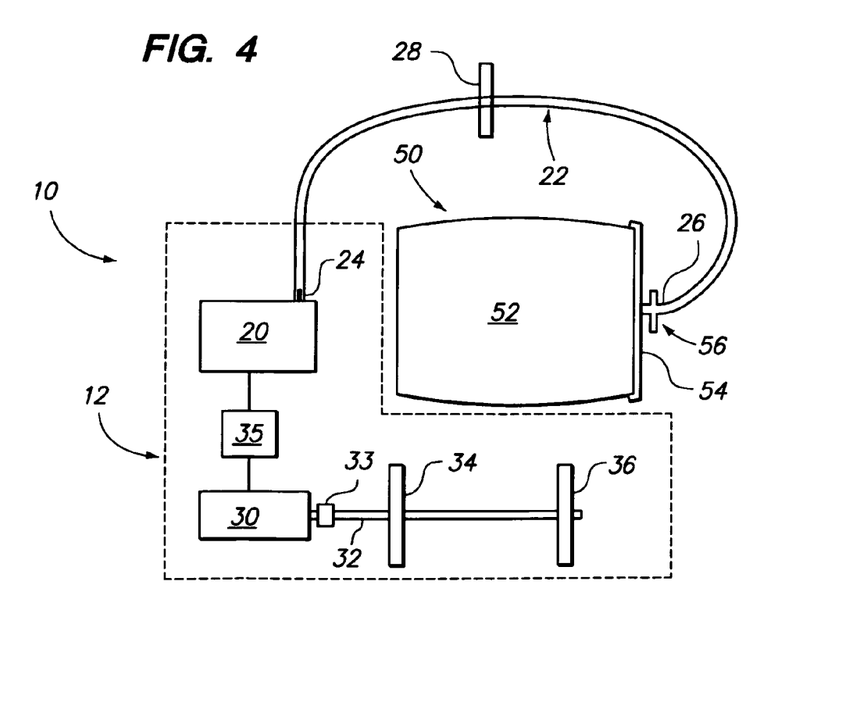
FIG. 4 is a simplified electromechanical schematic showing the electronic components of the apparatus of FIGS. 1–2.

With reference to FIG. 4, the base unit 12 includes an internal vacuum pump 20 which is connectable to the canister 50 via a connecting hose 22. The connecting hose 22 includes a first end 24 which is attachable to the vacuum pump 20, and a second end 26 which is connectable to a valve and handle assembly 56 built into the canister cover 54. Optionally, a fluid trap 28 may be provided in the connecting hose 22.

Figure 1:
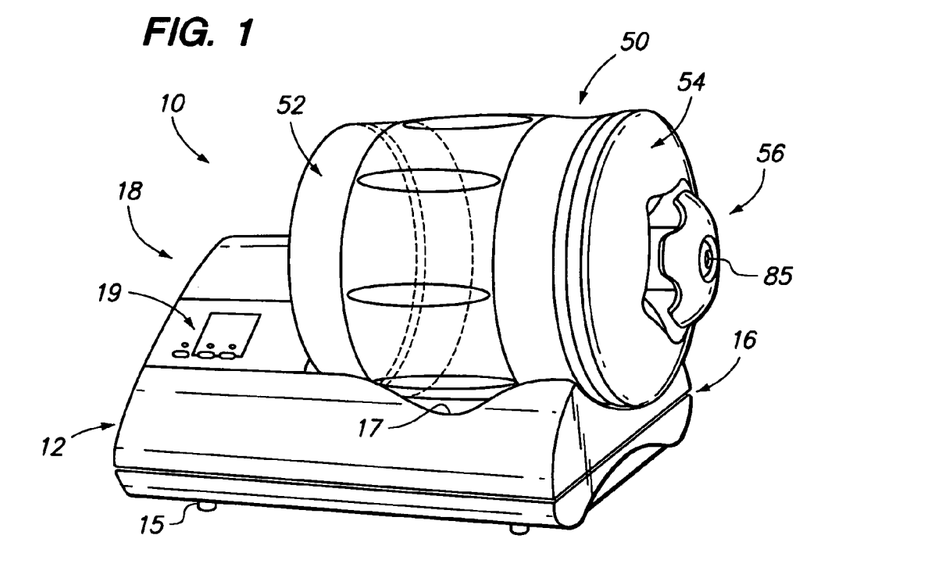
FIG. 1 is a perspective view of a food treating apparatus according to an illustrative embodiment of the present invention, taken from a first vantage point.
Figure 2:
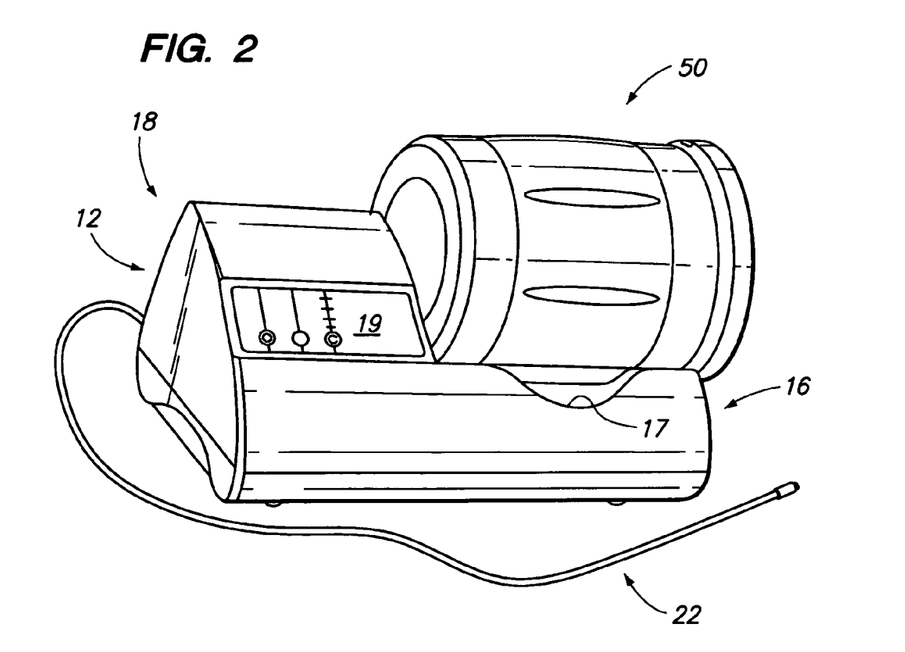
FIG. 2 is another perspective view of the apparatus of FIG. 1, taken from a second vantage point.
Figure 3A:
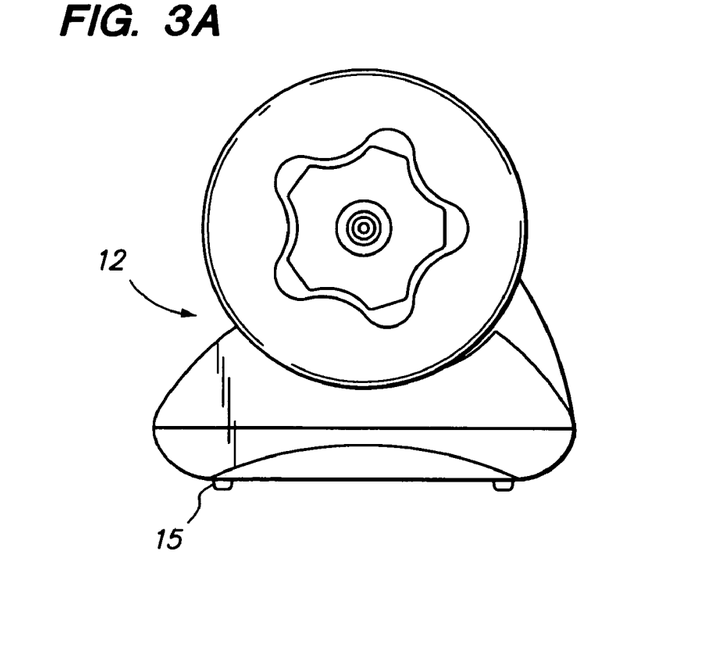
FIG. 3A is a side plan view of the apparatus of FIGS. 1–2.
Figure 3B:
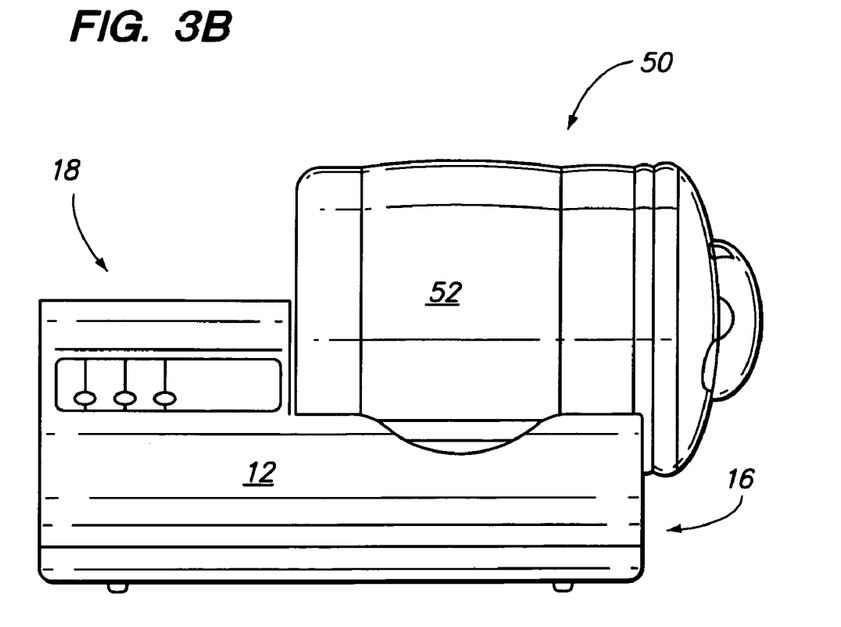
FIG. 3B is a front plan view of the apparatus of FIGS. 1–2.
Figure 3C:
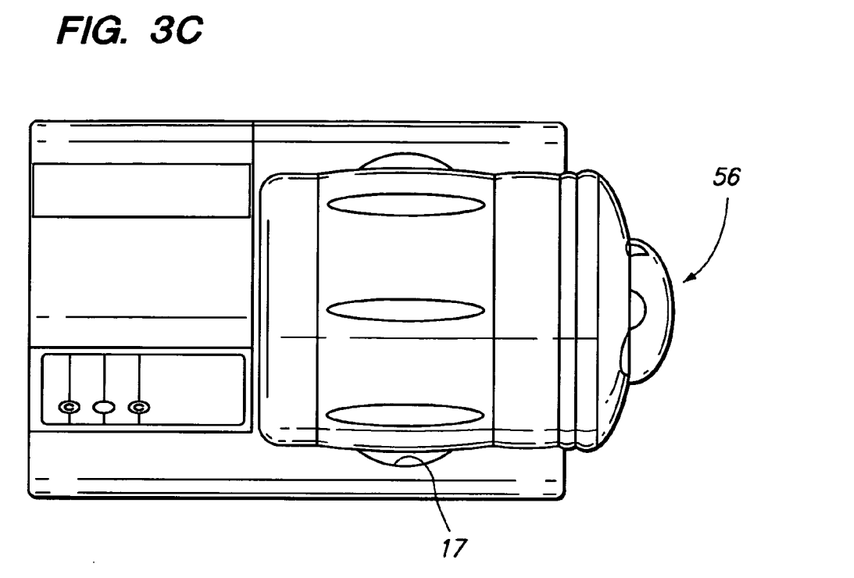
FIG. 3C is a top plan view of the apparatus of FIGS. 1–2.

It should be noted that when the canister 50 is being evacuated in preparation for tumbling food therein, it should be oriented with the cover 54 facing upwardly. After the canister 50 has been evacuated to the desired pressure level, it is then placed on is side on the cradle section 16 of the base unit 12, as shown in FIGS. 1–2.

The base unit 12 also includes an electric motor 30, which is operatively connected to a drive shaft 32. Optionally, the motor 30 and drive shaft 32 may be connected via a reduction gear 33. Where used, the reduction gear 33 is provided to slow down the rotation speed of the shaft 32 relative to the motor 30. Optionally, the reduction gear 33 may be incorporated into the motor assembly.

Figure 9:
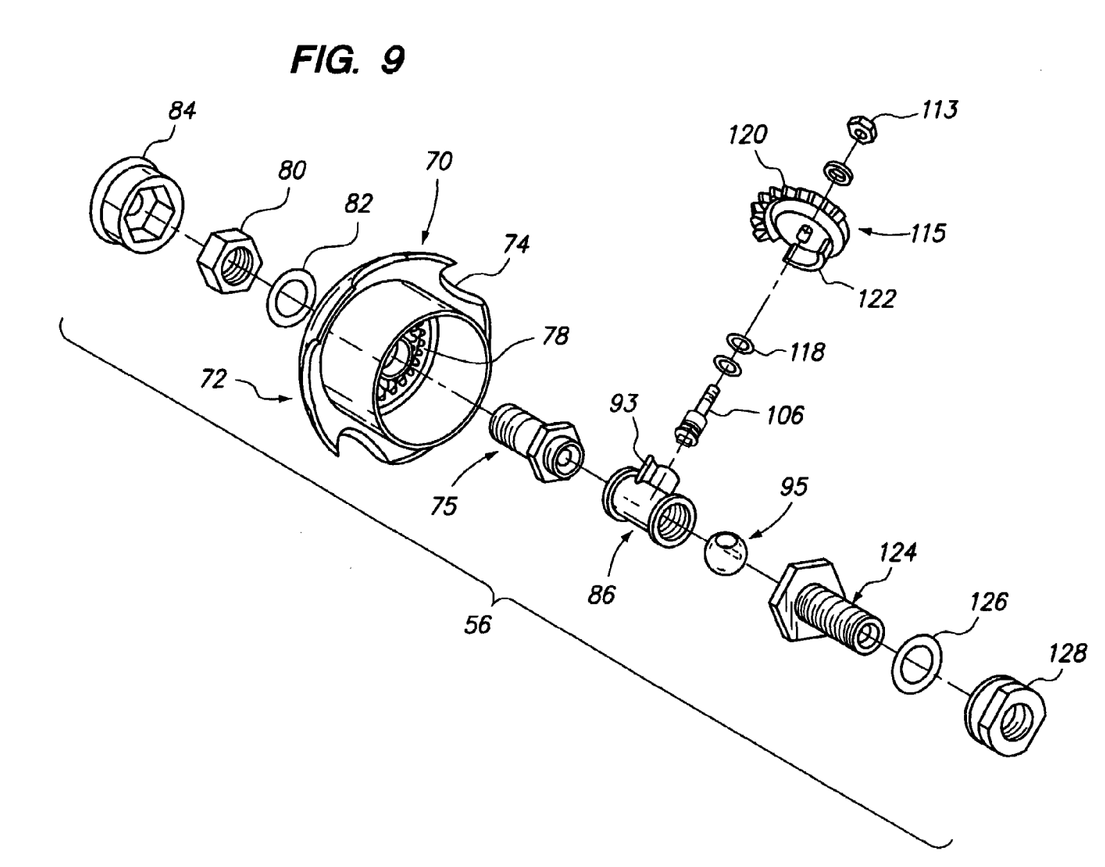
FIG. 9 is an exploded perspective view of the handle and valve assembly of FIG. 8, showing the internal structure thereof.

The motor 30 operates at least one drive roller 34 which is operatively connected to the drive shaft 32. In the embodiment of FIG. 9, the motor 30 is connected to two spaced-apart drive rollers 34, 36.

As seen in FIG. 6C, in the depicted embodiment, the cradle section 16 of the base unit 12 also includes two free rollers 38, 40 in addition to the drive rollers 34, 36.

The apparatus 10 also includes a control unit 35 inside the base unit 12, which controls operation of the motor 30 and the vacuum pump 20. The control unit 35 may include a microprocessor.

The Canister Assembly

Figure 7:
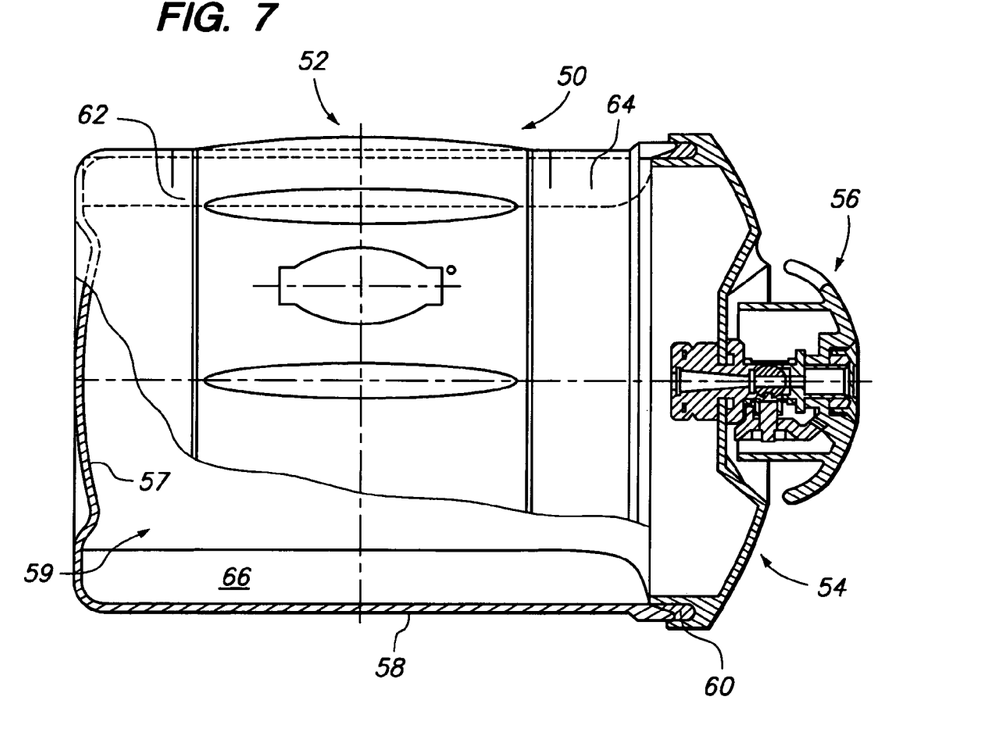
FIG. 7 is a side plan view, partly shown in cross-section, of a canister assembly which is another component of the apparatus of FIGS. 1–2.

As noted above, the canister 50 includes a substantially cylindrical main body 52 and a removable cover 54. The main body 52 of the canister 50 may be made translucent or transparent, to allow a user thereof to see the contents. The main body 52 includes a floor 57 and an integrally attached wall 58, both made in a sufficient thickness to withstand a reduced-pressure environment. The floor 57 and wall 58 cooperate to define a storage space 59 therebetween.

Referring now to FIG. 7, it will be seen that the canister assembly 50 includes an annular seal 60 interposed between the main body 52 and the cover 54, to maintain a reduced-pressure environment in the canister over a period of time. The seal 60 may be attached to the cover 54 or to the main body 52.

In the depicted embodiment, the main body 52 of the canister assembly 50 has a pair of spaced-apart shallow grooves 62, 64 formed therearound, to keep the canister aligned with the rollers 34, 36, 38, 40 of the base unit 12. The main body 52 may include a plurality of internal paddles 66 extending inwardly from the wall 58, as shown, to help agitate and tumble food therein as it rotates. The internal paddles may be oriented substantially perpendicular to the wall 58 at the point of attachment thereto.

Valve Structure

Referring now to FIGS. 9–14, the structure of the valve and handle assembly 56 will now be described. In the depicted embodiment, the valve and handle assembly 56 is constructed and arranged so that a 90 degree rotation thereof will open or close the valve 87 contained therein.

Figure 10A:
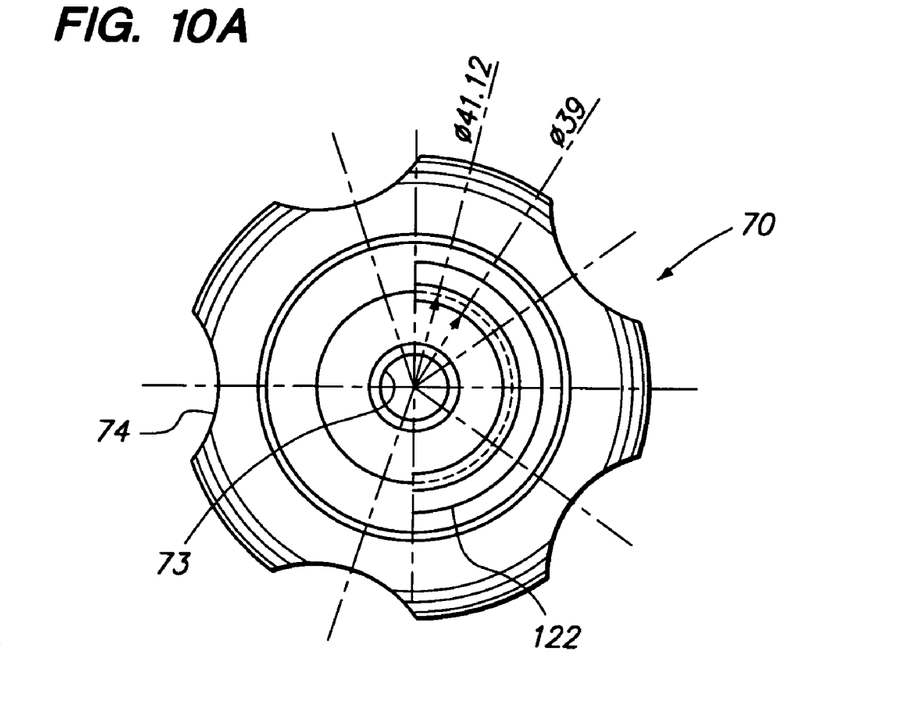
FIG. 10A is an end plan view of a handle which is one component of the handle and valve assembly of FIGS. 8–9.
Figure 10B:
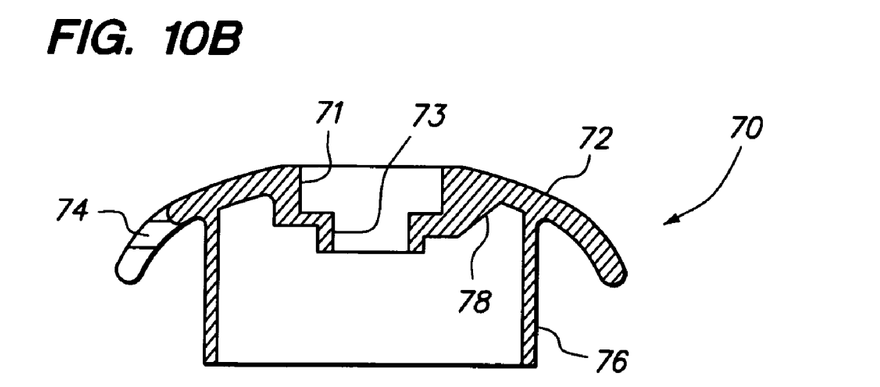
FIG. 10B is a cross-section of the handle.

The valve and handle assembly 56 includes a handle 70 which includes a substantially bowl-shaped handgrip portion 72 having cutouts 74 formed in an edge portion thereof, to provide a grippable surface. The handgrip portion 72 also has an outward-facing central recess 71 with a through hole 73 formed centrally therein, to receive an outer tube member 75 (FIG. 9). The handle 70 also includes a substantially cylindrical collar 76 formed integrally with, and coaxially attached to the handgrip portion 72. The handle 70 has a plurality of teeth 78 formed on a concave, inner surface of the handgrip portion 72 thereof, surrounding the through hole 73. The teeth 78 may form a circle or semicircle around the through hole 73.

The outer tube member 75 fits slidably through the through hole 73 in the handle 70, and is attached thereto by a nut 80 and washer 82. An elastomeric spacer 84 may, optionally, be provided for placement in the central recess 71 surrounding the nut 80. Where used, the spacer 84 has a vent hole 85 formed centrally therethrough (FIG. 1).

The valve 87 (FIG. 11A) is an important part of the valve and handle assembly 56. The valve 87 includes a valve body 86, a valve ball 95 which fits inside the valve body, a pair of bushings 98, 100 and a valve stem 106, as will be further described herein.

Figure 11A:
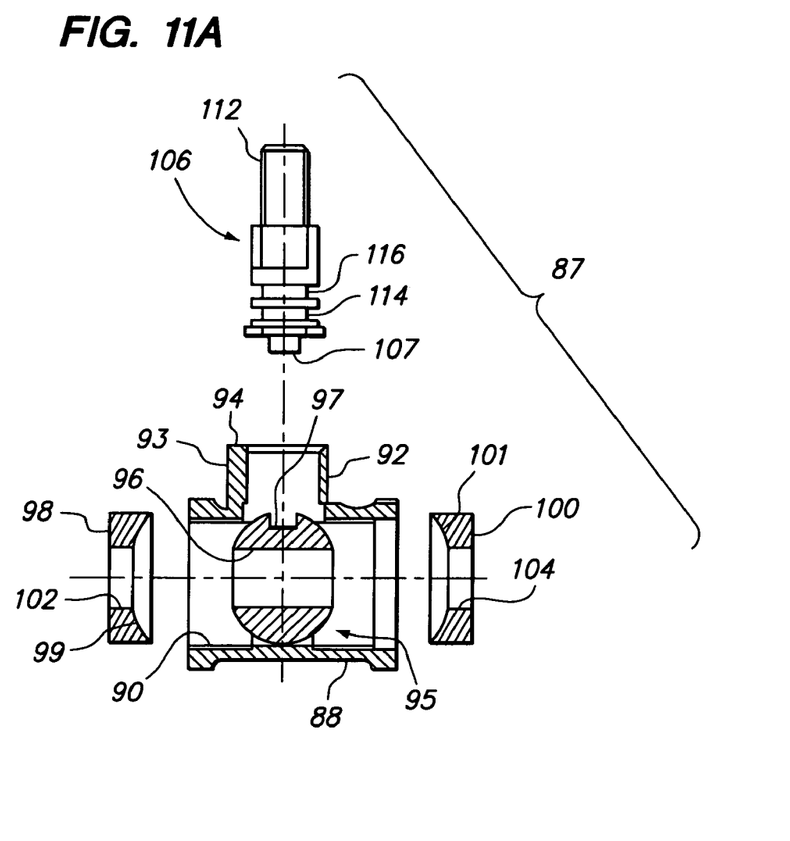
FIG. 11A is an exploded view, partially in side plan view and partially in cross-section, of a valve which is another component of the handle and valve assembly of FIGS. 8–9.
Figure 11B:
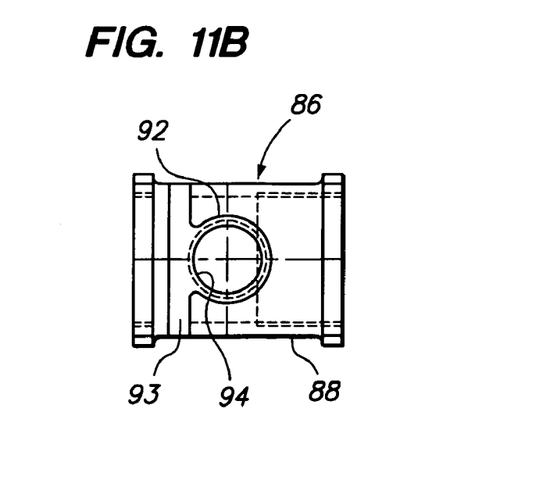
FIG. 11B is a top plan view of a valve body which is a component of the valve of FIG. 11A.
Figure 12A:
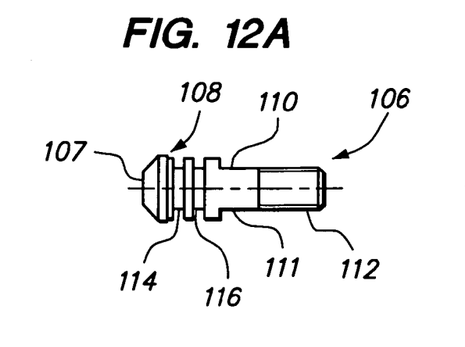
Figure 12B:
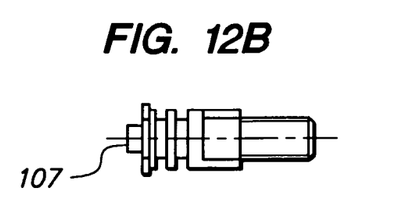
Figure 12C:
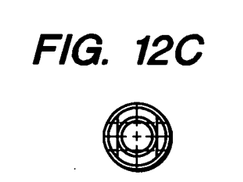

The valve body 86 is substantially centrally located in the valve and handle assembly 56. The valve body 86 is threadably attached to the outer tube member 75, and includes a cylindrical sleeve 88 with a hollow passageway 90 formed therethrough. The valve body 86 also includes a branch pipe 92 extending transversely from a central portion of the sleeve 88. The branch pipe 92 has a bore 94 formed centrally therein which is in fluid communication with the passageway 90 of the sleeve 88, as shown. The valve body 86 also has a stop flange 93 integrally formed with the branch pipe 92 and extending outwardly therefrom, for limiting movement of a gear plate 115 around the branch pipe.

A substantially spherical valve ball 95 is dimensioned to fit snugly inside of the passageway 90 of the sleeve 88, and is disposed substantially in the center thereof (FIG. 10A).

The valve ball 95 has a cylindrical bore 96 formed centrally therethrough, and also has a slot 97 formed in an outer side surface thereof. A pair of bushings 98, 100, having respective inwardly-facing concave sealing surfaces 99, 101 formed therein, fit into the passageway 90 on opposite sides of the valve ball 95, and serve to anchor the valve ball in place in the valve body, and cooperate therewith to form the valve closure. The bushings 98, 100 also have respective openings 102, 104 formed therethrough, as shown.

Figure 8:
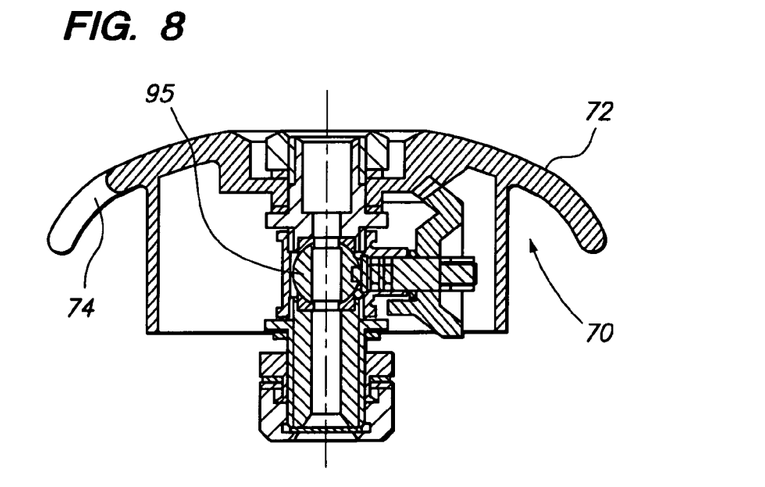
FIG. 8 is a cross sectional view of a handle and valve assembly which is part of the canister assembly of FIG. 7.

The handle and valve assembly 56 also includes a valve stem 106 with a relatively narrow tab 107 formed on an inner end 108 thereof. The tab 107 of the valve stem 106 fits engagingly into the slot 97 in the valve ball 95, to control rotating movement thereof. The middle portion of the valve stem 106 is also geometrically shaped to fit non-rotatably into a correspondingly-shaped hole 116 in the gear plate 115. In the depicted embodiment, the middle portion of the valve stem is a modified cylinder, with flat sides 110, 111 to lock it in place in the gear plate 115. The outer end portion 112 of the valve stem 106 is reduced in diameter, and has male threads formed thereon to receive a nut 113, in order to retain the gear plate 115 in place thereon. The valve stem 106 has two annular grooves 114, 116 extending therearound at the inner end 108 thereof to receive a pair of O-ring seals 118 thereon (FIG. 8).

Figure 13A:
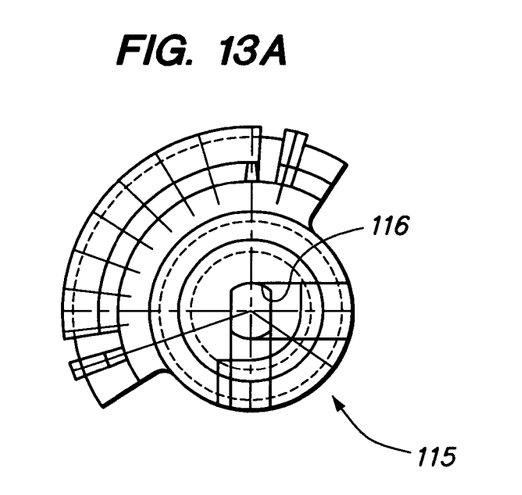
FIG. 13A is a front plan view of a gear plate which is another component of the handle and valve assembly of FIGS. 8–9.
Figure 13B:
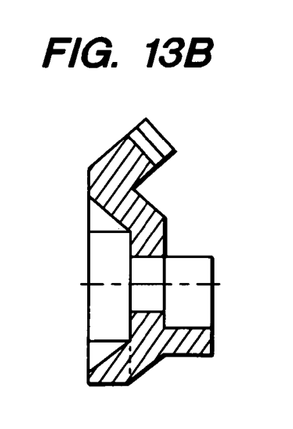
FIG. 13B is a cross-sectional view of the gear plate.

The gear plate 115 is a generally disc-shaped member, with a plurality of gear teeth 120 formed on an outer edge thereof, for intermeshing with the gear teeth 78 formed inside of the handle 70. The gear plate 115 also has an arcuate stop member 122 extending inwardly from an inner surface thereof, for interfering contact with the stop flange 93 of the valve body 86.

The valve and handle assembly 56 further includes a hollow inner tubular member 124 for attaching to the valve body 86 opposite the outer tube 75, and for inserting through a central hole in the cover 54. A sealing member 126 and nut 128 are also provided for cooperating with the inner tubular member 124 to attach the valve and handle assembly 56 to the cover 54.

In use, as the handle 70 is pivotally rotated through a limited range of travel, the handle rotates the gear plate 115, in turn, via the intermeshed gears 78, 120, and since the gear plate is mechanically linked to the valve ball 95 via the valve stem 106, the valve ball is rotated between open and closed positions thereof. The range of pivotal movement of the handle 70 is limited by interfering contact of the stop member 120, on the gear plate 115, with the stop flange 93 on the valve body 86.

In using the apparatus 10, the cover 54 is removed from the main body 52 of the canister 50, which is placed with the open portion thereof facing upwardly. Food to be marinated and tenderized, such as raw meat, fish or vegetables, is placed into the main body 52 of the canister 50. A suitable amount of a selected liquid marinade is added, and the cover is replaced on the canister 50. The vacuum hose 22 is then connected between the vacuum pump 20 and the valve and handle assembly, which is placed in the open position thereof.

The vacuum pump 20 is then activated, and is operated until a target vacuum is attained in the canister 50. The handle 70 is then rotated to close the valve 87, with the vacuum environment sealed therein. After the valve 87 has been sealed, the vacuum hose 22 is disconnected therefrom.

The canister 50 is then turned on its side and placed on the rollers, with the grooves in the main body 52 aligned with the rollers.

The control panel 19 is then operated to select a suitable tumbling time. 20 minutes is a good time for raw beef, pork, or poultry. Food such as meat or fish will receive marinade more quickly under low pressure than under atmospheric pressure, and additionally, by rotating the containment vessel, the food is agitated in the presence of the marinade, for a higher degree of marinade absorption. After tumbling has been completed, the canister 50 is then removed from the base unit 12 and placed with the cover 54 facing upwardly.

The handle 70 is rotated in the opposite direction to open the valve 87, the interior of the canister is allowed to return to atmospheric pressure, and the cover 54 is removed.

Then, the fully marinated and tenderized food is removed from the canister and cooked in an appropriate fashion.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

What is claimed is:

1. A food treatment apparatus, comprising a base unit and a canister for rotatable placement on the base unit;
   said base unit comprising
      a housing comprising a cradle section and a control panel section;
      a vacuum pump disposed in the housing;
      a control unit disposed in the housing;
      a control panel on the housing and in electronic communication with the control unit;
      at least one rotatable roller in the cradle section of the housing; and
   an electric motor operatively connected to the rollers for causing rotation thereof;
      said canister comprising a substantially cylindrical main body and a cover comprising a main cover plate and a valve and handle assembly operatively attached to the main cover plate, said cover being sealably attachable to said main body,
      wherein said valve and handle assembly comprises:
         a valve movable between an open position and a closed position;
         a handle for moving the valve between the open and closed positions thereof, the handle having an inner surface with gear teeth formed thereon in a curved pattern; and
         a gear plate disposed between said valve and said handle, said gear plate having a curved outer edge with a plurality of gear teeth formed thereon, the gear plate situated so that the gear teeth thereof intermesh with the gear teeth of the handle;
         and wherein said valve comprises:
            a valve body,
            a substantially spherical valve ball which fits into the valve body and which has a hollow central bore formed therethrough, and
            a valve stem having a proximal end which fits in the valve body and which engages the valve ball, and a distal end which is operatively connected to the gear plate.

2. The food treatment apparatus of claim 1, wherein said housing comprises a storage section formed therein, and a hinged cover over said storage section.

3. The food treatment apparatus of claim 1, wherein the cradle section of the housing has at least one arcuate cutout formed therein to allow a user to insert a hand below a portion of said canister as it rests on said cradle section.

4. The food treatment apparatus of claim 1, wherein said valve and handle assembly allows air to enter said canister in the open position said valve.

5. The food treatment apparatus of claim 4, wherein pivoting movement of said handle causes corresponding responsive movement of said ball valve.

6. The food treatment apparatus of claim 1, wherein said main body of said canister is translucent.

7. The food treatment apparatus of claim 1, wherein the main canister body has a plurality of grooves formed in a side thereof, said grooves being alignable with rollers of said base unit.

8. The food treatment apparatus of claim 1, further comprising a vacuum line with a built-in fluid trap for interconnecting said base unit to said canister, wherein said vacuum line comprises a connection fitting for inserting into an opening in said canister valve, wherein said connection fitting has at least two O-ring seals thereon.

9. The food treatment apparatus of claim 1, wherein said base unit comprises four rollers, at least one of which is driven by said motor.

10. The food treatment apparatus of claim 1, wherein said base unit comprises a raised grid having air inlet slots formed therein.

11. A food treatment apparatus, comprising a base unit and a canister for rotatable placement on the base unit;
    said base unit comprising
        a housing comprising a cradle section and a control panel section, the housing having at least one vent opening formed therein;
        a vacuum pump disposed in the housing;
        control unit disposed in the housing;
        a control panel on the housing and in electronic communication with the control unit; and
        at least one rotatable roller in the cradle section of the housing, and
    an electric motor operatively connected to the rollers for causing rotation thereof;
    said canister comprising a substantially cylindrical main body which is substantially translucent, and a cover comprising a valve, a handle for operating said valve, and a gear plate disposed between said handle and said valve,
    said cover being sealably attachable to said main body,
        wherein said valve comprises:
        a valve body comprising a cylindrical sleeve with a hollow passageway formed therethrough, and a branch pine extending substantially transversely from a central portion of the sleeve;
        a substantially cylindrical valve ball dimensioned to fit inside the passageway of the sleeve, said valve ball having a cylindrical bore formed centrally therethrough,
        a pair of bushings disposed in said sleeve of said valve body, each of said bushings having a respective inwardly-facing concave sealing surface formed therein, and
        a valve stem extending between and interconnecting said valve ball and said gear plate;
    wherein pivotal movement of said handle causes corresponding pivotal movement of said valve ball to selectively open or block fluid flow through said valve.

12. The food treatment apparatus of claim 11, wherein said housing comprises a storage section formed therein, and a hinged cover over said storage section.

13. The food treatment apparatus of claim 11, wherein the cradle section of the housing has at least one arcuate cutout formed therein to allow a user to insert a hand below a portion of said canister as it rests on said cradle section.

14. The food treatment apparatus of claim 11, wherein the main canister body has a plurality of grooves formed in a side thereof, said grooves being alignable with the rollers of said base unit.

15. The food treatment apparatus of claim 11, further comprising a vacuum line with a built-in fluid trap for interconnecting said base unit to said canister, wherein said vacuum line comprises a connection fitting for inserting into an opening in said canister valve, wherein said connection fitting has at least two O-ring seals thereon.

16. The food treatment apparatus of claim 1, wherein said base unit comprises four rollers, at least one of which is driven by said motor.

17. A food treatment apparatus, comprising a base unit and a canister for rotatable placement on the base unit;
    said base unit comprising
        a housing comprising a cradle section and a control panel section;
        a vacuum pump disposed in the housing;
        a control unit disposed in the housing;
        a control panel on the housing and in electronic communication with the control unit;
        at least one rotatable roller in the cradle section of the housing; and
    an electric motor operatively connected to the rollers for causing rotation thereof,
    said canister comprising a substantially cylindrical main body and a cover comprising a valve and handle assembly, said cover being sealably attachable to said main body,
        wherein said valve and handle assembly comprises:
        a valve movable between an open position and a closed position;
        a handle for moving the valve between the open and closed positions thereof, the handle having an inner surface with gear teeth formed thereon in a curved pattern; and
        a gear plate disposed between said valve and said handle, said gear plate having a curved outer edge with a plurality of gear teeth formed thereon, the gear plate situated so that the gear teeth thereof intermesh with the gear teeth of the handle;
        and wherein said valve comprises:
        a valve body,
        a substantially spherical valve ball which fits into the valve body and which has a hollow central bore formed therethrough, and
        a valve stem having a proximal end which fits in the valve body and which engages the valve ball, and a distal end which is operatively connected to the gear plate;
    and further wherein the main canister body has a plurality of grooves formed in a side thereof, said grooves being alignable with the rollers of said base unit.

* * * * *

UNITED STATES PATENT AND TRADEMARK OFFICE
CERTIFICATE OF CORRECTION

| | | |
|---|---|---|
| PATENT NO. | : 7,047,874 B1 | Page 1 of 1 |
| APPLICATION NO. | : 10/717982 | |
| DATED | : May 23, 2006 | |
| INVENTOR(S) | : Eastman | |

It is certified that error appears in the above-identified patent and that said Letters Patent is hereby corrected as shown below:

Column 7:
 Line 7, change "open position said valve." to --open position of said valve.--.
 Line 36, change "control unit disposed" to --a control unit disposed--.
 Line 52, change "branch pine extending" to --branch pipe extending--.

Column 8:
 Line 35, change "causing rotation thereof," to --causing rotation thereof;--.

Signed and Sealed this

Fifteenth Day of August, 2006

JON W. DUDAS
*Director of the United States Patent and Trademark Office*